Nov. 17, 1942.  D. H. HODGES  2,302,549
FISH LINE FLOAT
Filed Oct. 31, 1941
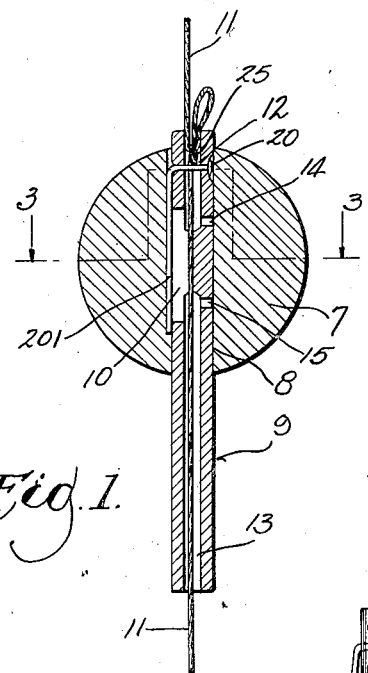
Fig. 1.
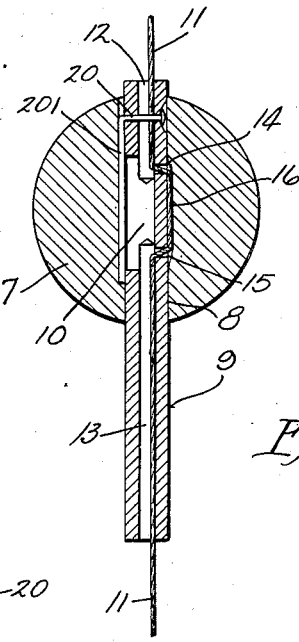
Fig. 2.
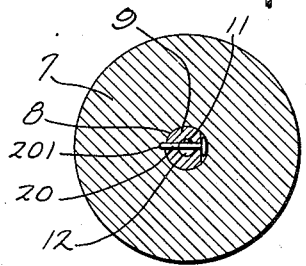
Fig. 3.
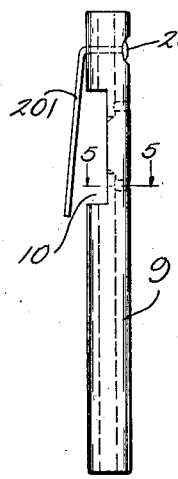
Fig. 4.
Fig. 5.
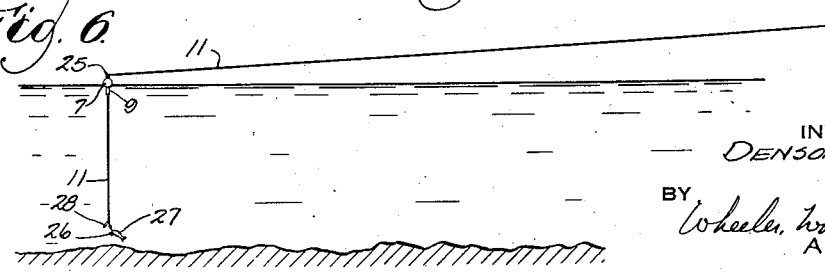
Fig. 6.
INVENTOR
DENSON H. HODGES
BY Wheeler, Wheeler & Wheeler
ATTORNEYS.

Patented Nov. 17, 1942

2,302,549

UNITED STATES PATENT OFFICE 2,302,549

FISH LINE FLOAT

Denson H. Hodges, Milwaukee, Wis.

Application October 31, 1941, Serial No. 417,239

7 Claims. (Cl. 43—49)

This invention relates to improvements in fish line floats.

It is the primary object of the invention to provide improvements whereby to particularly adapt for casting purposes a float of the type ordinarily frictionally adjustable on a fish line for still fishing.

There have been numerous instances in the art, of floats through which the fish line is led in a tubular guide with an arrangement such that the line emerges from the guide within the float and is frictionally bound between the guide and float to hold any position along the line to which it is manually adjusted. The present device is not only particularly useful for these purposes, but is also provided with improvements peculiarly adapting it for use where it is desired to throw the bait and float by casting to a remote point at which the bait will pass freely and without material friction through the float to any desired depth.

In this connection it is an object of the invention to provide a float adapted to function with lines of differing sizes and one in which a stop means in the line guide is not only off center therein but is extended from the line guide and interposed between the line guide and the float to provide increased frictional resistance to displacement of the line guide respecting the float without any substantial variation in such frictional resistance attributable to swelling of the parts when wet.

Other objects will be apparent to those skilled in the art upon study of the following disclosure of the invention.

In the drawing:

Fig. 1 is a vertical axial section through the device as used for casting.

Fig. 2 is a similar section through the device as used for still fishing.

Fig. 3 is a view taken in section on line 3—3 of Fig. 1.

Fig. 4 is a detail view in side elevation of the line guide separately.

Fig. 5 is a detail view taken in section on line 5—5 of Fig. 4.

Fig. 6 is a diagrammatic view illustrating how the device functions when used in the organization shown in Fig. 1.

Like parts are identified by the same reference characters throughout the several views.

The float 7 may be of any suitable buoyant material and may have any desired form. In practice I have used a cork sphere for the float having an axial bore at 8 through which the tubular line guide 9 is received. The line guide likewise may be of any suitable material but may conveniently be made of wood. It is laterally notched at 10 to facilitate the threading of the fish line 11 through the bores 12 and 13 from its respective ends which open into the notch 10. The separate bores 12 and 13 communicating with the notch are, for most purposes, equivalent to a single bore into which the notch opens. The arrangement shown, however, is of assistance when the line 11 is to be threaded through the device in the manner shown in Fig. 2, as there is a tendency for the line, when pushed into either of the bores 12 or 13, to emerge at the notch, thereby enabling the operator to grasp it and to guide its end through the lateral openings 14 and 15 so that a portion of the line at 16 lies between the tubular guide member 9 and the float 7.

With the line passing through the apparatus as shown in Fig. 2, the portion 16 thereof will be frictionally bound between the float and the guide to hold the float assembly in any desired position to which it may be manually adjusted on the line.

With the device assembled as shown in Fig. 1, the line will pass virtually without friction through the line guide unless or until its movement is restrained. To prevent the unlimited movement of the line through the guide, I provide at 20 a transverse pin, the head of which is recessed in the side of the guide as clearly shown in Figs. 1, 3 and 4. As best appears in Fig. 3, the pin is preferably not diametrically located but is slightly off center, leaving a smaller clearance in the bore 12 at one side of the pin than at the other. Externally of the guide member 9, the pin has a portion 201 extending downwardly and obliquely at an angle to the axis of the line guide, whereby its free end progressively diverges therefrom. The pin, however, is made of resilient material so that when the line guide and the pin are pushed into the float the pin will be held tightly to the side of the line guide as shown in Fig. 1, where its resilience supplements the frictional pressure between the line guide and the float and tends to make the frictional resistance to displacement uniform irrespective of any swelling either of the float or the line guide which may occur after these become water soaked.

The pin is loose in the line guide and may readily be swiveled therein so that its normally depending end portion 201 may be swung away from the lateral notch 10 to permit the line to be manipulated. The fact that the resilient terminal portion 20I of the pin normally extends across the notch when the device is assembled, assures that the lateral bias provided by this resilient pin portion 20I will be exerted in such a direction as to frictionally promote the clamping of the line portion 16 in the manner shown in Fig. 2.

If a light line is used it will be passed through the smaller opening provided by the off center position of the pin 20 and shown in Fig. 3. If the line is heavier, it is passed through the larger opening at the other side of the pin 20. In either case the arrangement will be such that the line will move freely through the line guide opposite the pin until the pin is engaged by a knot 25 which may be made at any desired point in the line. This knot will limit the depth to which the hook 26 and bait 27 will be drawn by the sinker 28 through the line guide after the float 7 strikes the water in casting.

It will be understood that the device is generally used in this manner when it is desired to cast a bait (usually live bait) to a point which might otherwise be inaccessible to the fisherman. When he reels in his line, drawing the sinker to the rod, the line will pass freely through the line guide of the float so that the float will not approach the rod until carried thereto by the sinker. At the commencement of the casting the sinker, hook, bait and float will be compactly assembled on the line immediately at the tip of the rod. They will usually be cast through the air in this relatively compact assembly but when they strike the water the float will remain on the surface as shown in Fig. 6, and the sinker will draw the line through the line guide to a distance determined by the knot 25, which need be only a small knot because of the arrangement provided for adapting the size of the opening in the line guide to different sizes of lines by locating the stop pin 20 off center. Thus, it is possible for the fisherman to place his bait at numerous points remote from his own position by using the present invention.

While the knot 25 will ordinarily not be required when the line is threaded through the apparatus in the manner shown in Fig. 2, it obviously may be used if desired, to limit the extent of frictional adjustment of the float.

I claim:

1. The combination with a float, of a line guide of generally tubular form adjustable in the float, and a pin extending transversely through the line guide and provided with a resilient end portion interposed between the line guide and float and resiliently biased outwardly from the line guide, whereby to provide means for frictionally resisting displacement of the line guide respecting the float.

2. The combination with a float having an opening, of a generally tubular line guide extending through the opening and provided with a line-receiving bore, a stop pin traversing the bore and projecting from the line guide and thence extending between the line guide and float, the portion of said pin so extending being biased for outward movement from the line guide whereby frictionally to engage the float, said pin being disposed off center with respect to the bore crossed thereby, whereby lines of differing sizes may be fitted relatively closely at one side or the other of said pin in said bore and knots in said lines may be engaged by said pin to limit line movement through said bore.

3. The combination with a float provided with a hole, of a generally tubular line guide frictionally movable through the hole and having a line-receiving bore, a pin extending transversely through the line guide and across said bore and provided with a free end portion interposed between the line guide and the float and biased for outward pressure against the float at the side of said hole, the line guide being provided with a lateral notch in the line guide opening through said bore at the side of the line guide at which the free end portion of said pin is disposed, and the line guide also being provided with apertures opening from the notch laterally through the line guide at points spaced axially of the line guide.

4. The combination with a line provided with a stop member, of a line guide having a bore through which said line is movable, said line guide having a lateral notch opening to said bore and having laterally opening apertures communicating with the notch at points spaced axially of the line guide, and a pin extending transversely through the line guide and across the bore therein at one side of the line in said bore and comprising complementary stop means engageable by the stop member of the line.

5. The combination with a line provided with a stop member, of a line guide having a bore through which said line is movable, said line guide having a lateral notch opening to said bore and having laterally opening apertures communicating with the notch at points spaced axially of the line guide, and a pin extending transversely through the line guide and across the bore therein at one side of the line in said bore and comprising complementary stop means engageable by the stop member of the line, and a float frictionally engaging said line guide and confining the said end portion of the pin against the side of the line guide, whereby frictionally to position the line guide respecting the float.

6. In a device of the character described, the sub-combination which includes a line guide having a line receiving bore, and a stop member disposed transversely therein and provided externally of the line guide with an angularly disposed resilient portion tending resiliently to diverge from parallelism with the line guide.

7. In a device of the character described, the sub-combination which includes a line guide having a line receiving bore, and a stop member disposed transversely therein and provided externally of the line guide with an angularly disposed resilient portion tending resiliently to diverge from parallelism with the line guide, said line guide being provided with a lateral notch opening to said bore and across which the resilient portion of said pin at least partially extends, said line guide also having lateral apertures opening to the notch at the side of the line guide opposite said resilient pin portion and at points spaced axially of the line guide.

DENSON H. HODGES.